Patented Oct. 14, 1952

2,614,044

UNITED STATES PATENT OFFICE 2,614,044

METHOD OF PREPARING CORN FOR POPPING

Howard C. Smith, Sioux City, Iowa, assignor to American Pop Corn Company, Sioux City, Iowa, a corporation of Iowa No Drawing. Application March 21, 1950, Serial No. 151,047

1 Claim. (Cl. 99—81)

This invention relates to a method of preparing pop corn for popping. An object of this invention is to provide such a method yielding a product characterized by great volume expansion on popping.

It is well known that there is a considerable variation in volume expansion on popping of corn derived from various sources or prepared for popping by different methods. Maximum volume expansion on popping, of course, is highly desirable.

It has been ascertained that, among other features, the moisture content of the corn has considerable effect on the volume expansion on popping. An optimum moisture content of about 12 to 13% is disclosed and claimed in the patent to Cloid H. Smith No. 1,938,981, issued December 12, 1933. It should be noted, in this connection, that the natural moisture content of pop corn when harvested generally ranges from about 16% to about 18% or higher.

I have now found that while the moisture content of the corn is indeed an important feature to be controlled in preparing corn for popping, maximum volume expansion is secured by a process including subjecting the corn to a curing step while reducing the moisture content of the corn by exposing the ears of corn to currents of atmospheric air over a period of months.

In proceeding according to this invention, the corn after harvesting is stored in the form of ears in covered cribs that are adequately ventilated. In other words, the atmosphere is allowed to circulate freely through the corn in the cribs. Further, before such storage, free corn kernels are separated from the ears, and the ears are deposited gently in the cribs, to minimize the detaching of kernels from the ears. Loose husks are also removed from the ears before storage of the corn. Shell corn tends to dry faster than corn on the ears, and both shell corn and loose husks tend to accumulate in pockets and thus interfere with the free circulation of air through the corn.

The ears are stored in the cribs at least through the winter and spring months. I have found that during the spring months a metabolic process (of unknown nature) takes place in the corn, as evidenced by the generation of heat in the corn. The process in question proceeds to an end point, after which the pop corn remains in the same condition without further chemical change. While this process is taking place, the corn is not suitable for popping with maximum expansion. At the end of this process, the popping characteristics of the corn have been improved. When further the moisture content of the corn has been reduced to about 12% to 14%, preferably to about 12.7% to 13.5%, the corn is ready for shelling and popping with maximum expansion.

During the crib storage, and particularly while the curing or "sweating" process takes place during the spring months, it may be necessary to turn over the corn ears in the cribs, to aid in maintaining uniform temperature and uniform rate of loss of moisture. The heat generated during the curing or "sweating" process aids in reducing the moisture content of the corn.

It should be understood that once the above indicated curing process has been completed, the corn may be left in the cribs to be removed and shelled at any desired time, so long as the moisture content falls within the indicated range. Once the corn has been removed from the cribs, the corn is shelled and packaged in air tight or moisture-proof containers to insure preservation of the indicated moisture content. Before packaging the shelled corn, I remove therefrom cob fragments, husks, kernels of field corn (ordinary corn), undersized and oversized pop corn kernels, underweight pop corn kernels, cracked pop corn kernels, foreign material and the like. The removal of such material leaves pop corn kernels of uniform size and weight that on popping expand to maximum volume.

The improved results obtained by my process are illustrated by the following experiment.

White pop corn and yellow pop corn samples containing excessive amounts of moisture were force dried in a tray at 100° F. for four hours. Similar samples of white pop corn and yellow pop corn were stored in ventilated cribs (as disclosed hereinabove) for fifteen months. Moisture determinations and popping tests were carried out on all samples before and after treatment, with results tabulated as follows:

DRYING AT 100° F. FOR 4 HOURS

| | Before Treatment | | After Treatment | |
|---|---|---|---|---|
| | Moisture Content | Expansion on Popping | Moisture Content | Expansion on Popping |
| | Percent | Percent | Percent | Percent |
| White Corn | 16.7 | 2,100 | 12.6 | 2,400 |
| Yellow Corn | 17.9 | 1,500 | 12.8 | 2,300 |

CRIB STORAGE FOR 15 MONTHS

| | | | | |
|---|---|---|---|---|
| White Corn | 16.7 | 2,100 | 12.8 | 3,000 |
| Yellow Corn | 17.9 | 1,500 | 12.5 | 2,850 |

The greatly increased volume on popping obtained by proceeding according to the present method is clearly evident.

Many details may be varied within a wide range without departing from the principles of this invention. It is therefore not to limit this patent otherwise than necessitated by the scope of the appended claim.

I claim:

A method of preparing popcorn for popping which comprises storing a quantity of freshly harvested popcorn ears under shelter but freely exposed to atmospheric air throughout the quantity for a period of time including the spring months to induce a curing of said popcorn evidenced by the generation of heat, said atmospheric exposure and said generation of heat both serving to reduce the original moisture content of said popcorn, sufficiently turning over said quantity of popcorn during said generation of heat to maintain uniform temperature in said popcorn whereby uniform drying and curing of the entire quantity of popcorn is promoted, continuing said storage until the moisture content of said popcorn has been reduced from between 16% to 18% to between 12.7% to 13.5%, continuing said storage after said reduction in popcorn moisture content whereby the moisture is maintained between said 12.7% and 13.5% without loss of desirable popping qualities, thereafter shelling said popcorn while it still has substantially said reduced moisture content and while such moisture content is still uniform throughout the quantity of popcorn, and packaging the shelled popcorn kernels in moistureproof containers.

HOWARD C. SMITH.

REFERENCES CITED

The following references are of record in the file of this patent:

UNITED STATES PATENTS

| Number | Name | Date |
|---|---|---|
| 1,938,981 | Smith | Dec. 12, 1933 |

OTHER REFERENCES

Ward: The Encyclopedia of Food, 50 Union Square, N. Y., page 405.

Kent-Jones: Modern Cereal Chemistry, 4th ed., 1947, page 157.

U. S. Farmer's Bulletin No. 1679, revised 1948, U. S. Govt. Printing Office (104), pages 9 to 13.